US012562967B2

(12) United States Patent
Burdin et al.

(10) Patent No.: US 12,562,967 B2
(45) Date of Patent: Feb. 24, 2026

(54) COMPUTER NETWORK PLATFORM FOR ROUTING AND VIRTUALIZATION

(71) Applicant: The MITRE Corporation, McLean, VA (US)

(72) Inventors: Jared R Burdin, Westford, MA (US); Peter Malinovsky, Arlington, MA (US)

(73) Assignee: The MITRE Corporation, McLean, VA (US)

( * ) Notice: Subject to any disclaimer, the term of this patent is extended or adjusted under 35 U.S.C. 154(b) by 535 days.

(21) Appl. No.: 17/726,230

(22) Filed: Apr. 21, 2022

(65) Prior Publication Data

US 2023/0344727 A1 Oct. 26, 2023

(51) Int. Cl.
H04L 45/76 (2022.01)
H04L 41/40 (2022.01)

(52) U.S. Cl.
CPC .............. H04L 41/40 (2022.05); H04L 45/76 (2022.05)

(58) Field of Classification Search
CPC ................................ H04L 41/40; H04L 45/76
See application file for complete search history.

(56) References Cited

U.S. PATENT DOCUMENTS

| | | | |
|---|---|---|---|
| 9,384,028 B1 * | 7/2016 | Felstaine | ............... H04L 45/586 |
| 9,860,164 B2 | 1/2018 | Jilani et al. | |
| 10,257,089 B2 | 4/2019 | Bays et al. | |

| | | | |
|---|---|---|---|
| 10,819,573 B2 | 10/2020 | Maes | |
| 10,834,004 B2 | 11/2020 | Yigit et al. | |
| 2016/0043944 A1 * | 2/2016 | Felstaine | ................ H04L 45/70 370/389 |
| 2018/0351874 A1 * | 12/2018 | Abhigyan | ........... H04L 12/4641 |
| 2019/0208553 A1 * | 7/2019 | Chou | ................... G06F 9/45558 |
| 2020/0195553 A1 | 6/2020 | Yigit et al. | |
| 2022/0124547 A1 * | 4/2022 | Young | ............... H04W 28/0247 |

OTHER PUBLICATIONS

Ciena's Data Sheet 3906, accessible at URL as of Sep. 19, 2020; 5 pages.
Miano et al. "A framework for eBPF-based network functions in an era of microservices." IEEE Transactions on Network and Service Management 18.1: 133-151, Jan. 29, 2021; 19 pages.

* cited by examiner

*Primary Examiner* — The Hy Nguyen
(74) *Attorney, Agent, or Firm* — Sterne, Kessler, Goldstein & Fox P.L.L.C.

(57) ABSTRACT

Disclosed herein are system, method, and computer program product embodiments for instantiating virtual network functions (VNFs). In some embodiments, a computer network infrastructure device comprises a purpose-built router (e.g., a packet routing and forwarding device) and a virtual machine host. The virtual machine host instantiates VNFs and identifies a first function to be executed on the data packet based on an attribute associated with the data packet. Moreover, the virtual machine host identifies a first VNF from the VNFs that are instantiated based on a first function type executed by the first VNF and the first function to be executed on the data packet. The virtual machine host coordinates the first VNF to execute a first function on the data packet. The first VNF outputs a resultant data packet in response to executing the first function on the data packet.

28 Claims, 8 Drawing Sheets

600

```
┌─────────────────────────┐
│   Receive a data packet  │
│           602            │
└─────────────────────────┘
             │
             ▼
┌─────────────────────────────┐
│ Determine that two or more  │
│ functions are to be         │
│ executed on the data packet │
│           604               │
└─────────────────────────────┘
             │
             ▼
┌─────────────────────────────┐
│ Determine that two or more  │
│ VNFs are to be allocated    │
│           606               │
└─────────────────────────────┘
             │
             ▼
┌─────────────────────────────┐
│ Determine an order to in    │
│ which the data packet is to │
│ be processed by the two or  │
│ more VNFs                   │
│           608               │
└─────────────────────────────┘
             │
             ▼
┌─────────────────────────────┐
│ Coordinate the two or more  │
│ VNFs to execute the two or  │
│ more functions on the data  │
│ packet in the order         │
│           610               │
└─────────────────────────────┘
             │
             ▼
┌─────────────────────────────┐
│ Perform next-hop            │
│ determination               │
│           612               │
└─────────────────────────────┘
```

500

600

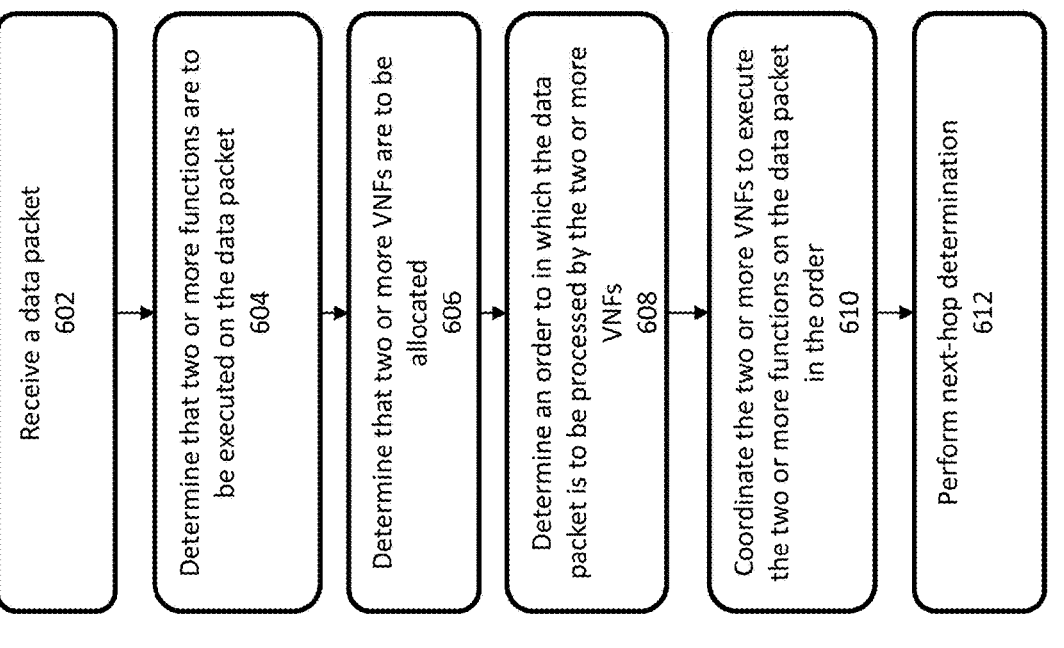

Receive a data packet
602

Determine that two or more functions are to be executed on the data packet
604

Determine that two or more VNFs are to be allocated
606

Determine an order to in which the data packet is to be processed by the two or more VNFs
608

Coordinate the two or more VNFs to execute the two or more functions on the data packet in the order
610

Perform next-hop determination
612

Receive a data packet
702

Instantiate VNFs
704

Determine that two or more VNFs are needed to execute one or more functions on the data packet
706

Coordinate the two or more VNF to execute the one or more functions
708

Perform next-hop determination
710

COMPUTER NETWORK PLATFORM FOR ROUTING AND VIRTUALIZATION

BACKGROUND

Virtualized network functions (VNFs) are often implemented on network function virtualization infrastructure to provide a complete network communication service. VNFs are software implementations of network functions. VNFs may be connected and/or combined to provide all of the capabilities required to provide the complete network communication service. This may involve the VNFs executing various functions on incoming data packets as the data packets are routed to their respective destinations. VNFs are often implemented in telecommunications networks (e.g., 5G communication networks).

Each VNF may execute a different function. Furthermore, networks may receive, route, and forward various types of data (e.g., image, text, audio, video, files, etc.). However, conventional systems cannot identify and allocate the appropriate VNFs to execute the respective functions on the incoming data.

BRIEF DESCRIPTION OF THE DRAWINGS

The accompanying drawings are incorporated herein and form a part of the specification.

FIG. 6 is a flowchart illustrating a process for acting on data packets with multiple VNFs, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
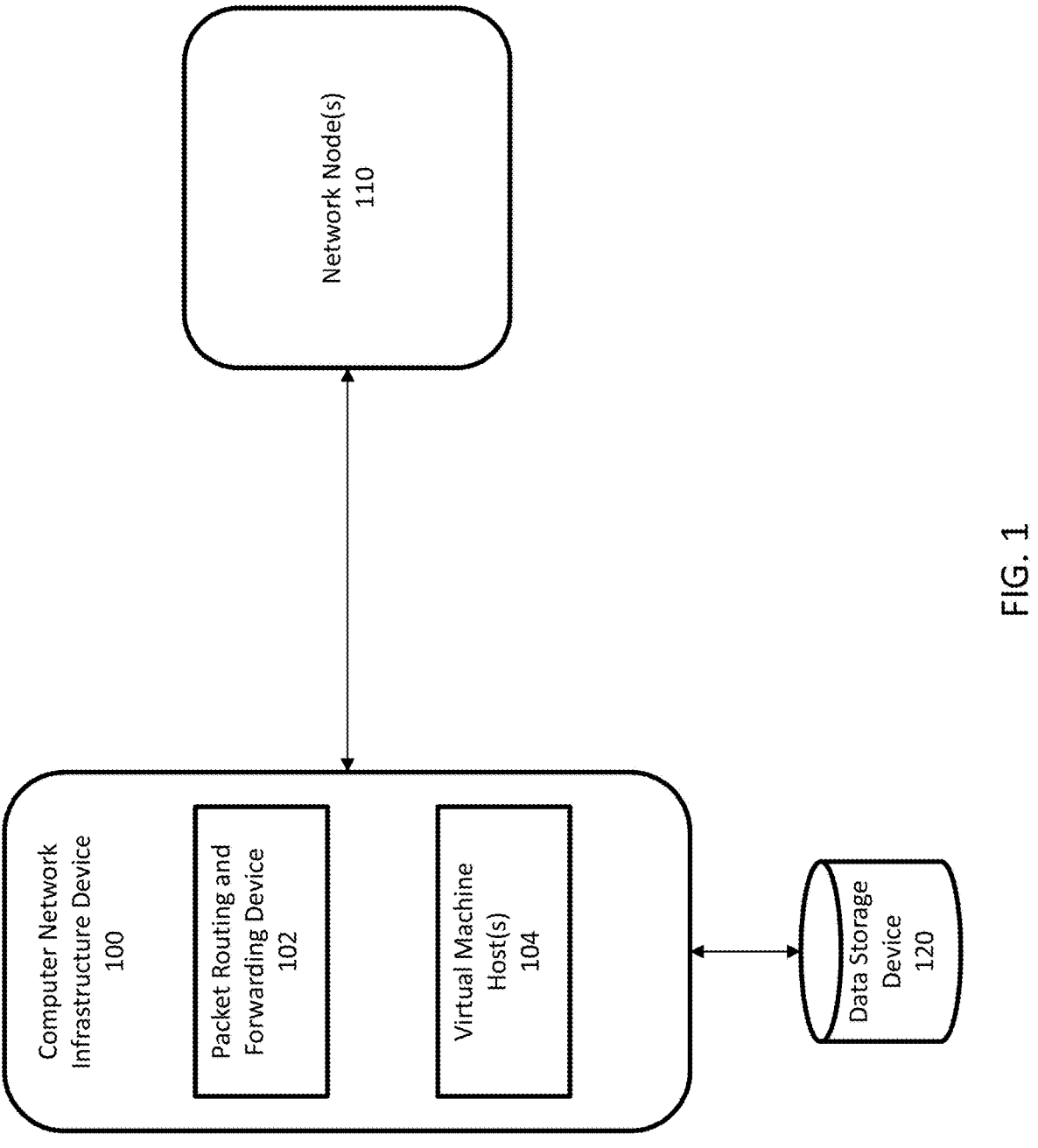
FIG. 1 is a block diagram of an architecture of a system for instantiating VNFs on a computer network infrastructure device, according to some embodiments.

Provided herein are system, apparatus, device, method, and/or computer program product embodiments, and/or combinations and sub-combinations thereof, for instantiating virtual network functions (VNFs) in a network infrastructure device.

As described above, conventional systems cannot identify and allocate VNFs to execute the necessary functions on incoming data in a given network. For example, VNFs are often implemented in telecommunication networks, such as 5G networks. Additionally, VNFs execute network functions including but not limited to: Switching: BNG, CG-NAT, routers; Tunneling gateway elements: IPSec/SSL VPN gateways, web-proxies; Traffic analysis: deep packet inspection devices, QoE measurement; Signaling: SBCs, IMS; Application-level optimization: CDNs, load Balancers, application filters; Home routers and set-top boxes; Mobile network nodes: HLR/HSS, MME, SGSN, GGSN/PDN-GW, RNC; Network-wide functions: AAA servers policy control, charging platforms; and Security functions: firewalls, intrusion detection systems, virus scanners, spam protection. Multiple functions may need to be executed on a single data packet before it is routed to its respective destination. However, conventional routers do not implement VNFs. As such, conventional systems cannot identify the appropriate VNFs to execute the functions in the desired order.

Embodiments described herein solve these problems by instantiating VNFs on a computer network infrastructure device disposed at a network edge, in the network core, in a datacenter, or any other location in the network. In some embodiments, a computer network infrastructure device comprises a purpose-built router (e.g., a packet routing and forwarding device) and a virtual machine host. The virtual machine host instantiates VNFs and identifies a first function to be executed on the data packet based on an attribute associated with the data packet. Moreover, the virtual machine host identifies a first VNF from the VNFs that are instantiated based on a first function type executed by the first VNF and the first function to be executed on the data packet. The virtual machine host coordinates the first VNF to execute a first function on the data packet. The first VNF outputs a resultant data packet in response to executing the first function on the data packet.

The embodiments described herein provide a computer network infrastructure device that comprises a virtual machine host that orchestrates VNFs to execute functions on data packets that are not typically implemented in routers and switches before and/or after the next-hop determination. The orchestration function could be implemented in software, hardware, or in a VNF. The computer network infrastructure device may be disposed at a network edge, in the network core, in a datacenter, or anywhere throughout the network. As such, the core functions to be executed on the data packet anywhere throughout the network.

Additionally, the embodiments described herein provide a single device that is configured to route or forward data packets and instantiate VNFs to execute pre-processing of the data packets before the data packets are routed or forwarded. This reduces the number of devices required by a given network.

Moreover, the embodiments described herein provide for identifying and allocating the appropriate VNFs to execute the functions on the incoming data packets. Additionally, the embodiments described herein provide for identifying and allocating the appropriate VNFs to execute the functions on the data packets before, after, or in parallel with a routing determination. Furthermore, the virtual machine host may identify a desired hierarchical order to execute the functions on the incoming data packets.

FIG. 1 is a block diagram of an architecture of a system for instantiating VNFs on a computer network infrastructure device, according to some embodiments. In an embodiment, the architecture may include a computer network infrastructure device 100, network node(s) 110, and data storage device 120. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Computer network infrastructure device 100 may be a network component that enables the communication between network node(s) 110. For example, computer network infrastructure device 100 may be an edge device disposed on at a network edge. An edge device provides an entry point into enterprise or service provider core networks. In this regard, the edge device may control the data flow between networks. For example, an edge device may control the data flow between devices and another network (e.g., Internet, Intranet, cloud computing environment, etc.). Examples of edge devices include but are not limited to customer premises equipment (CPE), routers, switches, network gateways, multiplexers, metropolitan area network devices, and wide area network devices.

Computer network infrastructure device 100 may comprise a packet routing and forwarding device 102 and virtual machine host(s) 104. Packet routing and forwarding device 102 may be a purpose-built router configured to receive data packets from network node(s) 110 and perform next-hop determination on the data packets. The next-hop determination may involve routing or switching the data packets to another network node(s) 110 within or outside the network.

Virtual machine host 104 may implement user-defined virtual machines or containers that perform functions on the packets that are not typically implemented in routers and switches before and/or after the next-hop determination. User-defined virtual machines or containers may be VNFs. In this regard, virtual machine host 104 identifies, allocates, and coordinates the appropriate VNFs to execute the respective functions on the data packets received by computer network infrastructure device 100 before the data packets are routed or forwarded a given network node 110. VNFs will be described in further detail with respect to FIGS. 2-4.

Network node(s) 110 may be one or more computing devices, servers, routers, switches, applications, virtual machines, etc. Network nodes 110 may be configured to transmit data packets to network nodes 110 within or outside the network via computer network infrastructure device 100.

Data storage device 120 may be one or more databases configured to store structured and unstructured data. Data storage device 120 may store information associated with the functions executed on data packets by VNFs. This allows virtual machine host 104 to track the completed, ongoing and pending functions.

As a non-limiting example, the system for instantiating VNFs on a computer network infrastructure device may be implemented in the fields of internet service providers (ISPs), 5G networks, other large scale networks, or small, medium, or large enterprise networks.

Figure 2:
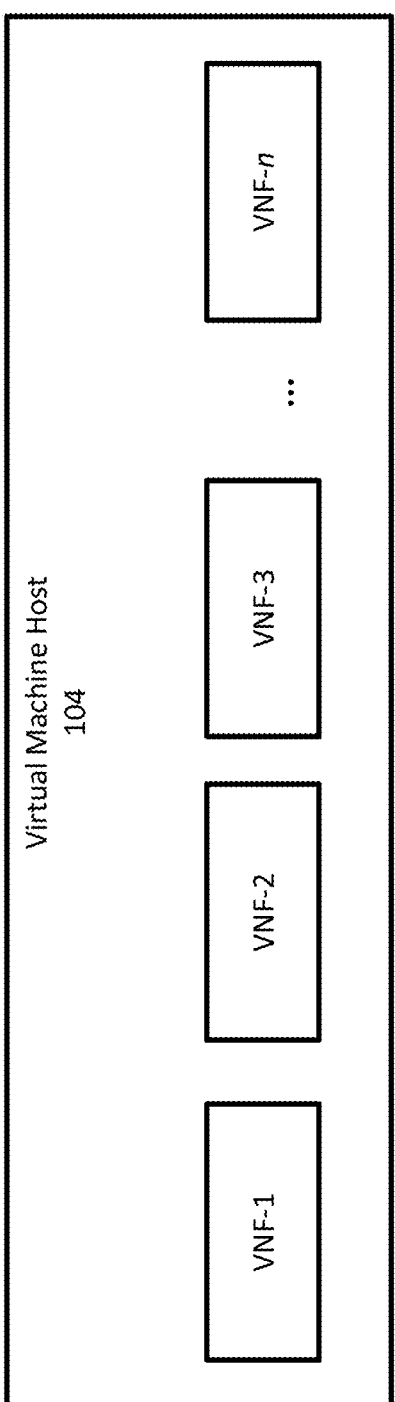
FIG. 2 is a block diagram VNFs instantiated by the virtual machine host, according to some embodiments.

FIG. 2 is a block diagram VNFs instantiated by the virtual machine host, according to some embodiments. FIG. 2 shall be described with reference to FIG. 1.

In some embodiments, virtual machine host 104 may instantiate VNFs 1-n. VNFs 1-n may be configured to execute network functions on data packets received by computer network infrastructure device 100. Each of VNFs 1-n may be configured to execute a different network function. Alternatively, two or more of VNFs 1-n may be configured to execute the same function. Furthermore, a given VNFs 1-n may depend on the output of at least one of VNF 1-n. As a non-limiting example, VNF-1 may depend on the output of VNF-2. In this regard, VNF-2 may execute its respective function on a data packet, which produces a resultant data packet. VNF-1 may execute its respective function on the resultant data packet.

A data packet may include numerous attributes, including data type, size, urgency, originating network node 110, intended destination, etc. The data type may be text, audio, video, data files, etc. In this regard, virtual machine host 104 may identify, allocate, and coordinate one or more of VNFs 1-n to execute the respective functions on the data packets received by computer network infrastructure device 100 based on the attributes.

As indicated above, VNFs 1-n may be software implementations of network functions. The network functions may include but are not limited to: Switching: BNG, CG-NAT, routers; Tunneling gateway elements: IPSec/SSL VPN gateways, web-proxies; Traffic analysis: deep packet inspection devices, QoE measurement, QoS measurement; Signaling: SBCs, IMS; Application-level optimization: CDNs, load Balancers, application filters; Home routers and set-top boxes; Mobile network nodes: HLR/HSS, MME, SGSN, GGSN/PDN-GW, RNC; Network-wide functions: AAA servers policy control, charging platforms; and Security functions: firewalls, intrusion detection/prevention systems, virus scanners, spam protection. In this regard, the software implementations of network functions may be executed on attributes such as the security policies of originating network node 110 or intended destination, size of the data packet, the urgency of the data packet, type of data in the data packet, etc.

As a non-limiting example, a network node 110 may transmit a data packet intended for a different network node 110. The data packet may include an email message comprising an attachment. Computer network infrastructure device 100 may receive the data packet.

Virtual machine host 104 may identify the attributes associated with the data packet. Virtual machine host 104 may retrieve the security policies of originating network node 110 and the intended destination from data storage device 120. The security policies associated with originating network node 110 may indicate that the data packet may indicate that emails, including attachments, are scanned for viruses and encrypted.

Virtual machine host 104 may determine the number of VNFs of VNFs 1-n to be allocated to scan the email and attachment for viruses and encrypt the email and attachment based on the attributes of the data packet. In this scenario, virtual machine host 104 may determine that 1 VNF is needed to scan the data packet for viruses and 2 VNFs are needed to encrypt the data packet based on the size of the data packet, type of data in the data packet (e.g., email and attachment), and an intended time frame to deliver the data packet (e.g., urgency).

Virtual machine host 104 may identify VNF-2 as the VNF configured to scan the data packet for viruses. Additionally, virtual machine host 104 may identify VNF-3 and VNF-n as the VNFs configured to encrypt the data packet. Virtual machine host 104 may also determine that VNF-2 is to scan the data packet before VNF-3 and VNF-n encrypts the data packet. As such, virtual machine host 104 may coordinate VNF-2 to scan the data packet for viruses. Virtual machine host 104 may coordinate VNF-3 and VNF-n to encrypt the scanned data packet once the data packet has been scanned for viruses.

In some embodiments, VNF-2 may identify a virus in the data packet. In this scenario, virtual machine host 104 may coordinate VNF-1 to remove the virus and coordinate VNF-3 and VNF-n to encrypt the scanned data packet with the virus removed. This way, VNF-1, VNF-2, VNF-3, and VNF-n may be in a cascading service chain.

Once the data packet is encrypted, packet routing and forwarding device 102 may perform next-hop determination on the data packet. Packet routing and forwarding device 102 may forward or route the data packet to its intended destination. In some embodiments, packet routing and forwarding device 102 may forward or route the data packet toward its intended destination. In this regard, the data packet may make one or more hops before reaching its intended destination.

As another non-limiting example, a first network node 110 may transmit a first data packet intended for a second network node 110. Additionally, a third network node 110 may transmit a second data packet intended for a fourth network node 110. The first data packet may include text data. The second data packet may include video data. Computer network infrastructure device 100 may receive the first and second data packets.

Virtual machine host 104 may identify the attributes associated with the first and second data packets. Virtual machine host 104 determines that a QoS measurement is needed for the first and second data packets. Virtual machine host 104 may determine that VNF-1 is configured to execute QoS measurement on text data and VNF-2 is configured to execute QoS measurement on video data. As such, virtual machine host 104 may coordinate VNF-1 to execute the QoS measurement on the first data packet and VNF-2 to execute the QoS measurement on the second data packet.

Once the QoS measurement is completed on the first and second data packets, packet routing and forwarding device 102 may perform next-hop determination on the first and second data packets. Packet routing and forwarding device 102 may forward or route the first and second data packets to their intended destination based on the QoS measurement. In some embodiments, packet routing and forwarding device 102 may forward or route the data packet toward its intended destination. In this regard, the data packet may make one or more hops before reaching its intended destination.

In some embodiments, packet routing and forwarding device 102 may perform next-hop determination before or in parallel with the processing of the data packet using the VNFs.

As yet another non-limiting example, a network node 110 may transmit a data packet intended for a different network node 110. Computer network infrastructure device 100 may receive the data packet.

Virtual machine host 104 may identify the attributes associated with the data packet. Virtual machine host 104 may determine the functions to be executed on the data packet based on the attributes associated with the data packet. Virtual machine host 104 may determine the number of VNFs from VNFs 1-n to be allocated to execute the functions on the data packet. Virtual machine host 104 may determine that an additional VNF (e.g., VNF-n+1) is needed to execute the functions on the data packet based on the attributes (e.g., size or data type) associated with the data packet or due to the availability or workload of other VNFs. Virtual machine host 104 may instantiate VNF-n+1. VNF-n+1 may be a replica of any one of VNF-1-VNF-n.

In some embodiments, virtual machine host 104 may delete or remove VNFs from VNF-1-VNF-n due to the availability or workload of VNFs. For example, if all of VNFs of VNF-1-VNF-n are not necessary to process the data packet, virtual machine host 104 may delete or remove one or more of the VNFs.

In some embodiments, virtual machine host 104 may transfer a VNF to a different computer network infrastructure device within or outside the network. The different computer network infrastructure device may include a different virtual machine host. The VNF may be a template or copy of the VNF at virtual machine host 104. Alternatively, the VNF may include state information indicating its operation while in virtual machine host 104.

In some embodiments, virtual machine host 104 may store data associated with each function that has been executed on a data packet in the data storage device 120. This way, virtual machine host 104 may track the completed, on-going, and pending functions.

Figure 3:
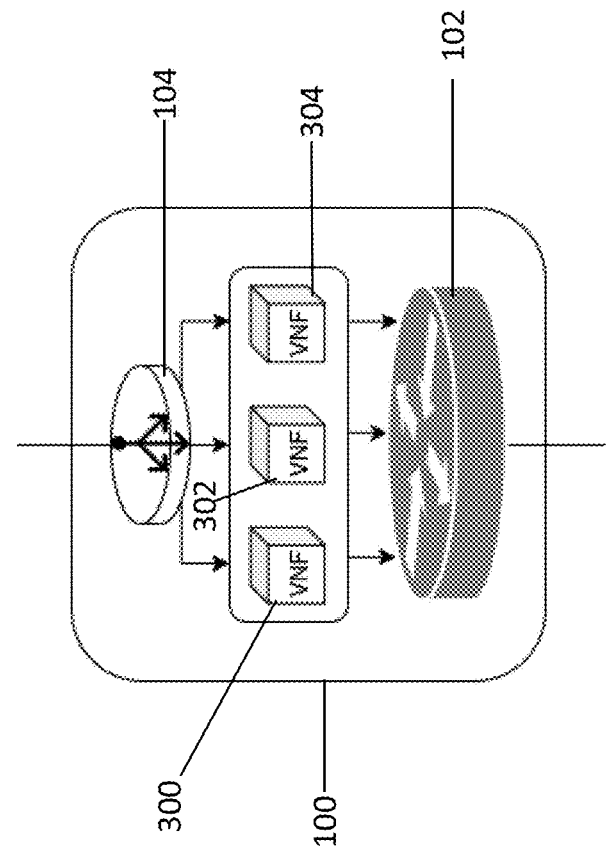
FIG. 3 is a block diagram of a computer network infrastructure device, according to example embodiments.

FIG. 3 is a block diagram of a computer network infrastructure device, according to example embodiments. In some embodiments, computing network infrastructure device 100 may receive a first, second, and third data packet. Virtual machine host 104 may identify the attributes associated with the first, second, and third data packet. Virtual machine host 104 may instantiate VNFs 300-304. To this end, virtual machine host 104 may determine that VNF 300 is to execute one or more functions on the first data packet, VNF 302 is to execute one or more functions on the second data packet, and VNF 304 is to execute one or more functions on the third data packet.

VNFs 300-304 may execute the respective functions on the first, second, and third data packets and output the resultant data packets. Packet routing and forwarding device 102 may route or forward the resultant first, second, and third data packets to their respective destinations.

Figure 4:
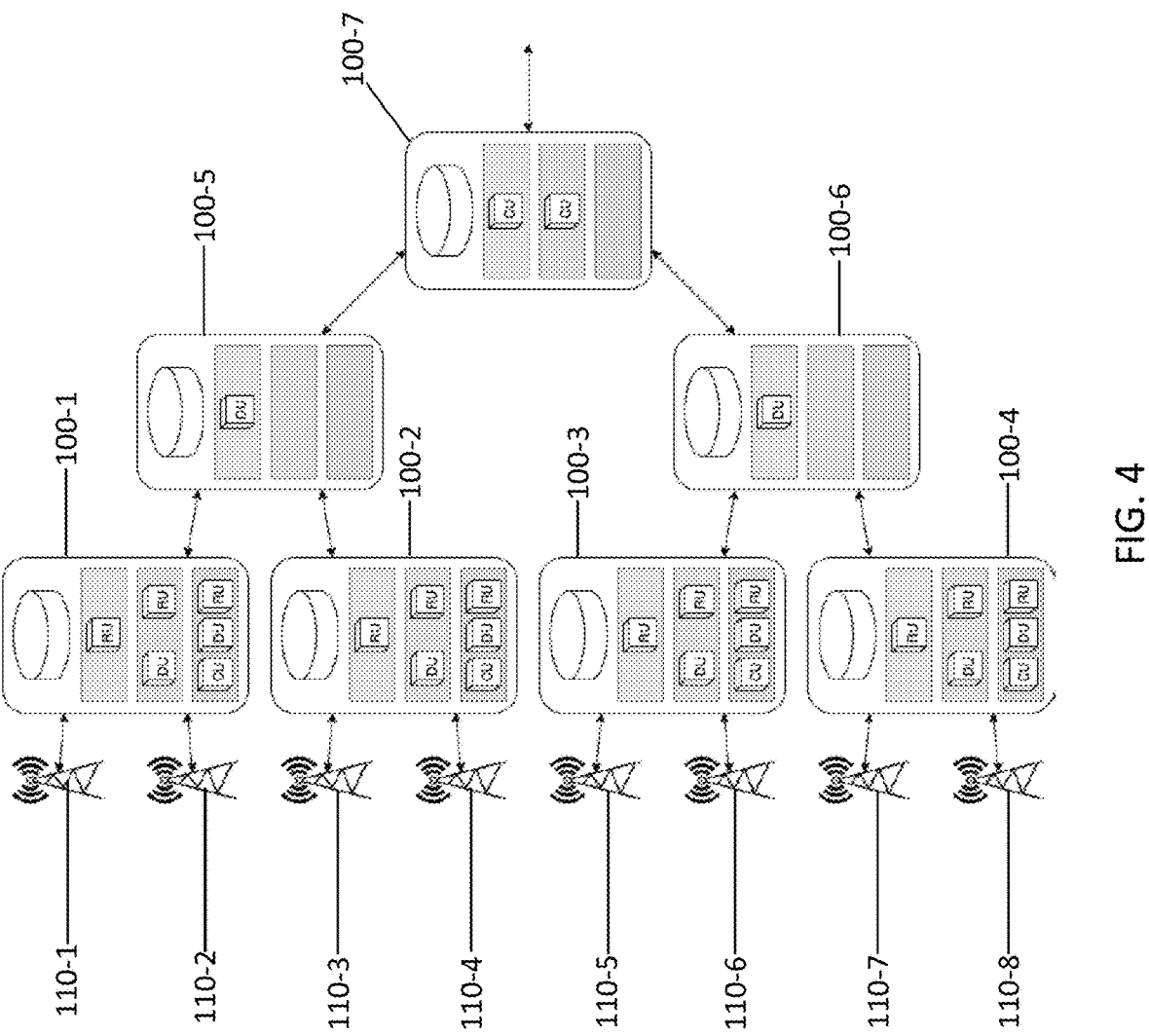
FIG. 4 is a block diagram of a 5G network implementing VNFs, according to some embodiments.

FIG. 4 is a block diagram of a 5G network implementing VNFs, according to some embodiments. 5G networks are cellular networks divided up based on geographical areas. The geographical areas are referred to as cells. 5G wireless devices may communicate by radio waves with a cellular base station (e.g., gNB) via an antenna. The base station assigns radio resources to be used by the 5G wireless devices to communicate. The base stations are connected to switching centers and routers. The switching centers and routers may be part of a computer network infrastructure device 100. A 5G wireless device moving from one cell is automatically handed off seamlessly to the local cell.

An advancement of 5G is the implementation of management functions as VNFs. By doing so, 5G network providers can save the cost and energy of implementing 5G networks. Furthermore, by using VNFs in 5G networks, the 5G network can be changed, managed, monitored, and optimized more efficiently. Moreover, VNFs allow for 5G network slicing, allowing VNFs to run on top of physical infrastructure. This allows for a physical network to be divided into multiple virtual networks capable of supporting multiple radio access networks.

As shown in FIG. 4, a 5G network may include network nodes 110-1-110-8. Network nodes 110-1-110-8 may be base stations in the 5G network. Network nodes 110-1-110-8 may be in communication with computer network infrastructure devices 100-1-100-4. For example, network nodes 110-1 and 110-2 may be in communication with computer network infrastructure device 100-1, network nodes 110-3 and 110-4 may be in communication with computer network infrastructure device 100-2, network nodes 110-5 and 110-6 may be in communication with computer network infrastructure device 100-3, and network nodes 110-7 and 110-8 may be in communication with computer network infrastructure device 100-4.

Computer network infrastructure devices 100-1-100-4 may be in communication with computer network infrastructure devices 100-5-100-6. Specifically, computer network infrastructure devices 100-1 and 100-2 may be in communication with computer network infrastructure device 100-5, and computer network infrastructure devices 100-3 and 100-4 may be in communication with computer network infrastructure device 100-6.

Computer network infrastructure devices 100-1-100-7 may include a packet routing and forwarding device 102 and virtual machine host 104. Virtual machine host 104 may implement VNFs of 5G network components. For example, virtual machine host 104 of computer network infrastructure devices 100-1-100-4 may instantiate VNFs implementing a radio unit (RU), distributed unit (DU), and central unit (CU).

The VNFs implementing an RU may be configured to coverts radio signals sent to and from the antenna into a digital signal for transmission over packet networks. The VNFs implementing DU may provide support for the lower layers of the protocol stack, such as RLC, MAC, and Physical layer. The VNFs implementing the CU may provide support for the higher layers of the protocol stack, such as SDAP, PDCP, and RRC.

Computer network infrastructure devices 100-5-100-6 may include VNFs for implementing a DU. Computer network infrastructure device 100-7 may instantiate VNFs for implementing a CU and DU.

The VNFs of computer network infrastructure devices 100-1-100-7 may include a first path, second path, and third path. As a non-limiting example, each of computer network infrastructure devices 100-1-100-4 may include a VNF for RU in the first path, VNFs for DU and RU in the second path, and VNFs for CU, DU, and RU in the third path. Each of computer network infrastructure devices 100-5-100-6 may include a VNF for DU in its first path. Computer network infrastructure device 100-7 may include a VNF for CU in the first path and a VNF for CU in the second path.

In some embodiments, 5G wireless devices may be in communication with network nodes 110-1-110-8. A given 5G wireless device may attempt to communicate with another system or device by transmitting a data packet (e.g., message, email, iMessage, SMS message, social media post, etc.). The data packet may be transmitted to a respective network node of network nodes 110-1-110-8 based on the user's geographic area.

The network node may transmit the data packet to the respective computer network infrastructure device of computer network infrastructure devices 100-1-100-4. Virtual machine host, 104 of the computer network infrastructure device, may identify, allocate, and coordinate the VNFs to execute the network functions on the data packet. Once the functions are executed, packet routing and forwarding device 102 may route or forward the resultant data packet to computer network infrastructure device 100-5 or 100-6. Virtual machine host, 104 of the computer network infrastructure device 100-5 or 100-6, may identify, allocate, and coordinate the VNFs to execute the network functions on the resultant data packet. Once the functions are executed, packet routing and forwarding device 102 may route or forward the resultant data packet to computer network infrastructure device 100-7. Virtual machine host 104 of the computer network infrastructure device 100-7 may identify, allocate and coordinate the VNFs to execute the network functions on the resultant data packet. Once the functions are executed, packet routing and forwarding device 102 may route or forward the resultant data packet to its intended destination.

In some embodiments, network traffic may be processed through the first, second, or third paths based on QoS requirements, a preexisting Service Level Agreement (SLA), or an identifier. For example, a data packet received at computer network infrastructure device 100-1 with low latency requirements could be processed by the RU, DU, and CU VNFs in the first or second paths of computer network infrastructure device 100-1 and returned to network nodes 110-1 or 110-2 to for transmission. Alternatively, a response packet could be generated by the VNFs in computer infrastructure device 100-1 for transmission.

Moreover, computer network infrastructure device 100-1 may receive another data packet with less stringent requirements. The other data packet may be processed by the VNF of the RU in the first path. The other data packet may be forwarded to computer network infrastructure device 100-5 for processing with the VNF for the DU in the first path. The other data packet may be then forwarded to computer infrastructure device 100-7 for processing with the VNF of the CU processing in the first path.

Figure 5:
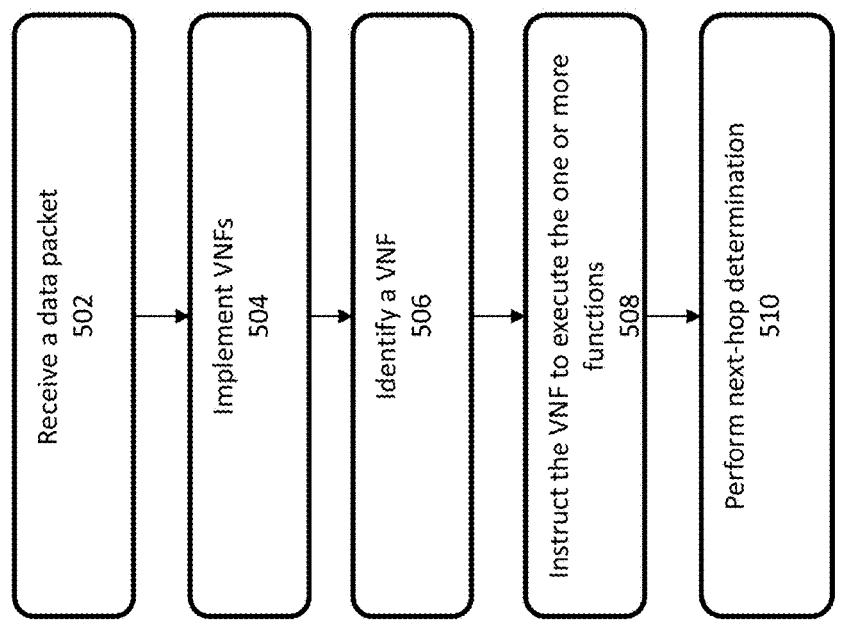
FIG. 5 is a flowchart illustrating a process for acting on data packets, according to some embodiments.

FIG. 5 is a flowchart illustrating a process for acting on data packets, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, computer network infrastructure device 100 receives a data packet. The data packet may include text, audio, video, application data, or raw data. Computer network infrastructure device 100 may receive the data packet from a network node 110 and it may be intended to be transmitted to another network node 110 within or outside the network. Computer network infrastructure device 100 may include packet routing and forwarding device 102 and virtual machine host 104.

In 504, virtual machine host 104 instantiates VNFs. The VNFs may be software implementations of network functions. VNFs may be configured to execute one or more functions on data packets before the data packets are routed or forwarded to the respective network node 110. Virtual machine host 104 may instantiate additional VNFs as needed.

In 506, virtual machine host 104 identifies a VNF from the VNFs instantiated based on attributes associated with the data packet that is configured to execute one or more functions on the data packet. Specifically, virtual machine host 104 may determine the functions to be executed on the data packet based on the attributes of the data packet. The attributes may include size, data type, originating network node 110, intended destination, urgency, etc. Virtual machine host 104 may identify the VNF based on the type of function performed by the VNF.

In 508, virtual machine host 104 coordinates the VNF to execute one or more functions on the data packet. Once the one or more functions have been executed, the VNF outputs the resultant data packet.

In 510, packet routing and forwarding device 102 performs next-hop determination on the resultant data packet. To this end, packet routing and forwarding device 102 may route or forward the data packet to the intended destination.

In some embodiments, packet routing and forwarding device 102 may route or forward the data packet toward the intended destination.

FIG. 6 is a flowchart illustrating a process for acting on data packets with multiple VNFs, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps can be performed simultaneously, or in a different order than shown in FIG. 6, as will be understood by a person of ordinary skill in the art.

Method 600 shall be described with reference to FIG. 1. However, method 600 is not limited to that example embodiment.

In 602, computer network infrastructure device 100 receives a data packet. Computer network infrastructure device 100 may receive the data packet from a network node 110 and it may be intended to be transmitted to another network node 110 within or outside the network.

In 604, virtual machine host 104 determines that two or more functions are to be executed on the data packet based on the attributes of the data packet. The attributes may include size, data type, originating network node 110, intended destination, urgency, etc.

In 606, virtual machine host 104 determines that two are more VNFs are to be allocated to execute the two or more functions on the data packet based on the type of functions executed by the two or more VNFs and the attributes associated with the data packet. For example, virtual machine host 104 may determine that based on function types of the two or more functions, two or more VNFs may be needed to execute the two or more functions. As an example, virtual machine host 104 may determine the number of VNFs needed to execute the two more functions based on the size of the data packet.

In 608, virtual machine host 104 determines an order to execute the two or more VNFs. Virtual machine host 104 may determine the order based on the dependencies of the VNFs. That is, a first VNF may be dependent on the output of a second VNF. As such, virtual machine host 104 may determine that the second VNF is to execute its function before the first VNF. The first VNF may use the resultant data packet from the second VNF to execute its function.

In 610, virtual machine host 104 coordinates the two or more VNFs to execute the two or more functions on the data packet in the order. Once the one or more functions have been executed, the two or more VNFs output the resultant data packet.

In 612, packet routing and forwarding device 102 performs next-hop determination on the resultant data packet. To this end, packet routing and forwarding device 102 may route or forward the data packet to the intended destination. In some embodiments, packet routing and forwarding device 102 may route or forward the data packet toward the intended destination.

Figure 7:
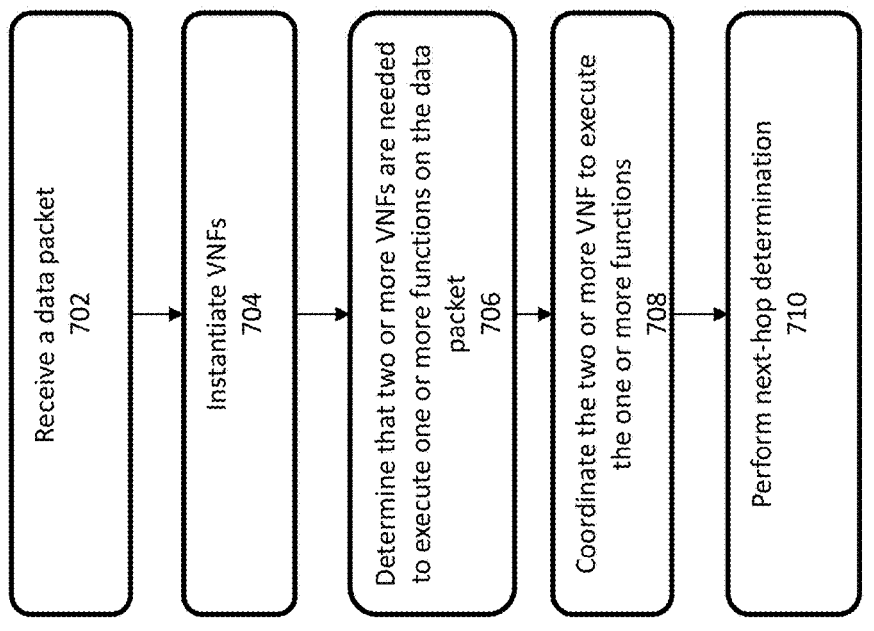
FIG. 7 is a flowchart illustrating a process for processing a data packet with multiple VNFs, according to some embodiments.

FIG. 7 is a flowchart illustrating a process for processing a data packet with multiple VNFs, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps can be performed simultaneously, or in a different order than shown in FIG. 5, as will be understood by a person of ordinary skill in the art.

Method 700 shall be described with reference to FIG. 1. However, method 700 is not limited to that example embodiment.

In 702, computer network infrastructure device 100 receives a data packet. Computer network infrastructure device 100 may receive the data packet from a network node 110 and it may be intended to be transmitted to another network node 110 within or outside the network.

In 704, virtual machine host 104 instantiates VNFs. The VNFs may be software implementations of network functions. VNFs may be configured to execute one or more functions on data packets before the data packets are routed or forwarded to the respective network node 110. Virtual machine host 104 may instantiate additional VNFs as needed.

In 706, virtual machine host 104 determines that two or more VNFs are needed to execute one or more functions on the data packet based on the attributes of the data packet. In some embodiments, the determination could be performed in hardware or software, or by a VNF, in a nonlimiting example. The attributes may include size, data type, originating network node 110, intended destination, urgency, etc. As such, virtual machine host 104 may determine that based on the size of the data or the urgency of the data, two or more VNFs are needed to execute one or more functions on the data packet. This allows for the pooling of resources to execute the one or more functions.

In 708, virtual machine host 104 coordinates the two or more VNFs to execute one or more functions on the data packet. Once the one or more functions have been executed, the two or more VNFs output the resultant data packet.

In 710, packet routing and forwarding device 102 performs next-hop determination on the resultant data packet. To this end, packet routing and forwarding device 102 may route or forward the data packet to the intended destination. In some embodiments, packet routing and forwarding device 102 may route or forward the data packet toward the intended destination.

Figure 8:
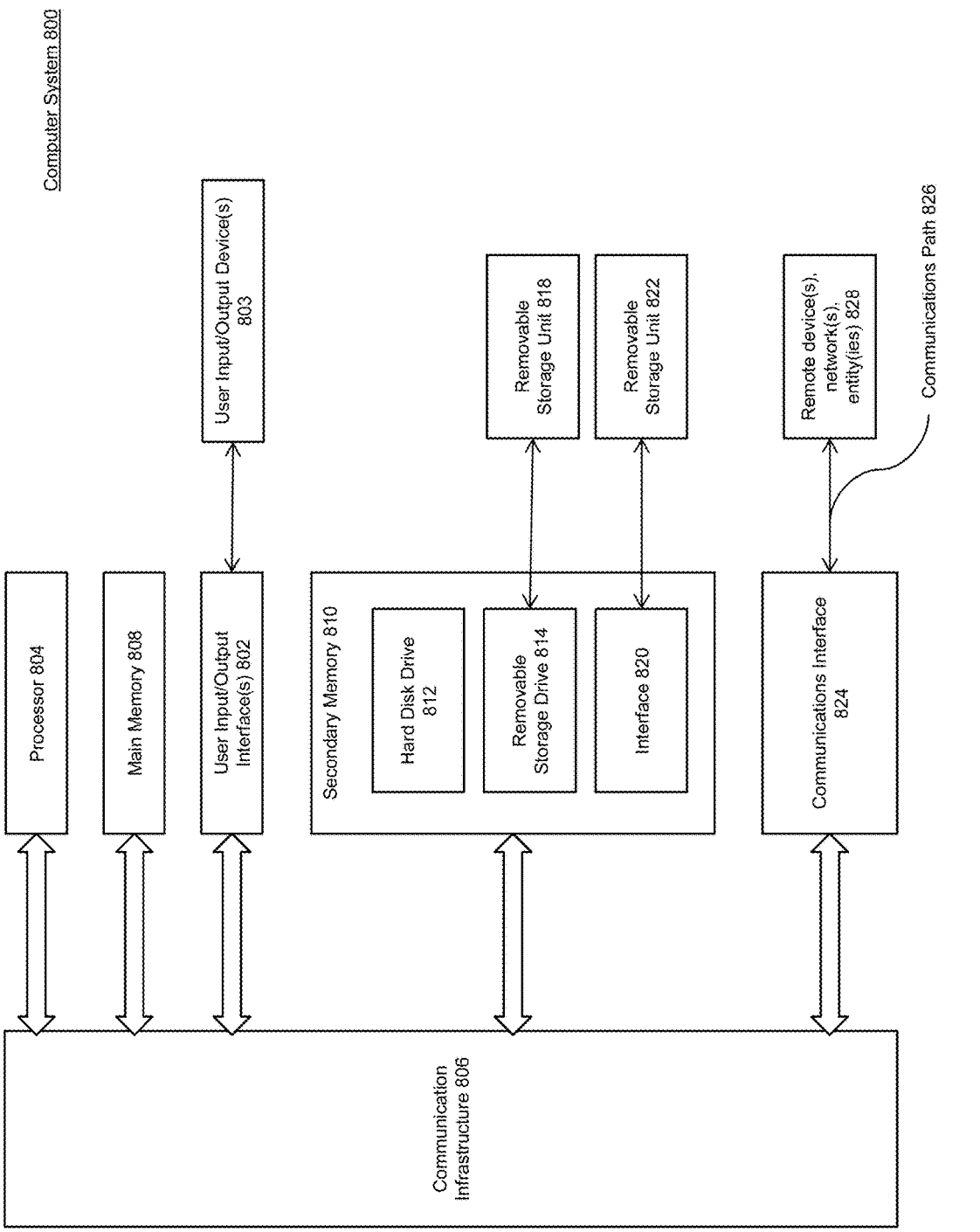
FIG. 8 is an example computer system useful for implementing various embodiments.

Various embodiments can be implemented, for example, using one or more computer systems, such as computer system 800 shown in FIG. 8. Computer system 800 can be used, for example, to implement methods 500 of FIG. 5, 600 of FIG. 6, and 700 of FIG. 7. Furthermore, computer system 800 can be at least part of computer network infrastructure device 100, network node 110, and data storage device 120, as shown in FIG. 1. For example, computer system 800 route communication to various applications. Computer system 800 can be any computer capable of performing the functions described herein, including, but not limited to, a general-purpose computing device with a routing module or a purpose-built routing device with a virtualization host module.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output interface(s) 802 that can be used to communicate with user input/output device(s) 803, such as monitors, keyboards, pointing devices, etc., or to provide an interface to communicate with software on another computer, for example terminal emulation software.

Computer system 800 also includes a main or primary memory 808, such as random access memory (RAM). Main memory 808 can include one or more levels of cache. Main memory 808 has stored therein control logic (i.e., computer software) and/or data.

Computer system 800 may also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, USB interface and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 can include other means, instrumentalities, or other approaches for allowing computer programs and/or other instructions and/or data to be accessed by computer system 800. Such means, instrumentalities, or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828) and to receive data packets for processing through VNFs and forwarding. For example, communication interface 824 can allow computer system 800 to communicate with remote devices 828 over communications path 826, which can be wired and/or wireless, and which can include any combination of LANs, WANs, the Internet, etc. Control logic and/or data can be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing.

Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:
1. A network device comprising:
a purpose-built router; and a virtual machine host configured to:

instantiate, on the network device and based on an intended delivery time period, a plurality of virtual network functions (VNFs), wherein the plurality of VNFs comprise at least two function types;

identify at least a first function to be executed on a first data packet and a second function to be executed on a second data packet based on one or more attributes associated with the first data packet and the second data packet, wherein the one or more attributes comprise one or more of: a data type, a data size, or security policies of an originating network node;

identify a first VNF from the plurality of VNFs based on a first function type executed by the first VNF and the first function to be executed on the first data packet;

identify a second VNF from the plurality of VNFs based on a second function type executed by the second VNF and the second function to be executed on the second data packet;

identify a hierarchical order to execute the first function and the second function on the respective first data packet and the second data packet; and coordinate, based on the hierarchical order and the intended delivery time period, at least the first VNF and the second VNF to execute, on the network device, the first function on the first data packet and execute the second function on the second data packet, wherein the first VNF outputs a first resultant data packet in response to executing the first function on the first data packet and the second VNF outputs a second resultant data packet in response to executing the second function on the second data packet.

2. The network device of claim 1, wherein the virtual machine host is further configured to allocate a set of VNFs from the plurality of VNFs to execute a plurality of functions on the second data packet based on the one or more attributes associated with the second data packet.

3. The network device of claim 1, wherein the network device is disposed at a network edge.

4. The network device of claim 1, wherein the network device is disposed at a network core.

5. The network device of claim 1, wherein the network device is disposed at a datacenter.

6. The network device of claim 1, wherein the virtual machine host is further configured to store the one or more attributes associated with the first data packet and the second data packet and the first function and the second function executed on respective ones of the first data packet and the second data packet in a data storage device.

7. The network device of claim 1, wherein the virtual machine host is further configured to:

instantiate an additional VNF to the plurality of VNFs based on the one or more attributes associated with the first data packet; and coordinate the additional VNF and the first VNF to execute the first function.

8. The network device of claim 1, wherein the virtual machine host is further configured to delete a VNF from the plurality of VNFs.

9. A computer-implemented method for instantiating virtual network functions (VNFs), the computer-implemented method comprising:

instantiating, on a network device and based on an intended delivery time period, a plurality of virtual network functions (VNFs), wherein the plurality of VNFs comprise at least two function types;

identifying at least a first function to be executed on a first data packet and a second function to be executed on a second data packet based on one or more attributes associated with the first data packet and the second data packet, wherein the one or more attributes comprise one or more of: a data type, a data size, or security policies of an originating network node;

identifying a first VNF from the plurality of VNFs based on a first function type executed by the first VNF and the first function to be executed on the first data packet;

identifying a second VNF from the plurality of VNFs based on a second function type executed by the second VNF and the second function to be executed on the second data packet;

identifying a hierarchical order to execute the first function and the second function on the respective first data packet and the second data packet; and coordinating, based on the hierarchical order and the intended delivery time period, the first VNF and the second VNF to execute, on the network device, the first function on the first data packet and execute the second function on the second data packet, wherein the first VNF outputs a first resultant data packet in response to executing the first function on the first data packet and the second VNF outputs a second resultant data packet in response to executing the second function on the second data packet.

10. The computer-implemented method of claim 9, further comprising allocating a set of VNFs from the plurality of VNFs to execute a plurality of functions on the second data packet based on the one or more attributes associated with the second data packet.

11. The computer-implemented method of claim 9, wherein instantiating the plurality of VNFs comprises instantiating the plurality of VNFs at a network edge.

12. The computer-implemented method of claim 9, wherein instantiating the plurality of VNFs comprises instantiating the plurality of VNFs at a network core.

13. The computer-implemented method of claim 9, wherein instantiating the plurality of VNFs comprises instantiating the plurality of VNFs at a datacenter.

14. The computer-implemented method of claim 9, further comprising storing the one or more attributes associated with the first data packet and a plurality of functions executed on the first data packet in a data storage device.

15. The computer-implemented method of claim 9, further comprising transferring a VNF of the plurality of VNFs to another network device.

16. The computer-implemented method of claim 15, wherein the plurality of VNFs include state information associated with their operation.

17. The computer-implemented method of claim 9, further comprising:

instantiating an additional VNF to the plurality of VNFs based on the one or more attributes associated with the first data packet; and coordinating the additional VNF and the first VNF to execute the first function.

18. The computer-implemented method of claim 9, further comprising deleting a VNF from the plurality of VNFs.

19. A non-transitory computer-readable medium having instructions stored thereon that, when executed by at least one computing device, cause the at least one computing device to perform operations, the operations comprising:

instantiating, based on an intended delivery time period, a plurality of virtual network functions (VNFs) on a network device, wherein the plurality of VNFs comprise at least two function types;

identifying at least a first function to be executed on a first data packet and a second function to be executed on a second data packet based on one or more attributes associated with the first data packet and the second data packet, wherein the one or more attributes comprise one or more of: a data type, a data size, or security policies of an originating network node;

identifying a first VNF from the plurality of VNFs based on a first function type executed by the first VNF and the first function to be executed on the first data packet;

identifying a second VNF from the plurality of VNFs based on a second function type executed by the second VNF and the second function to be executed on the second data packet;

identifying a hierarchical order to execute the first function and the second function on the respective first data packet and the second data packet; and coordinating, based on the hierarchical order and the intended delivery time period, the first VNF and the second VNF to execute, on the network device, the first function on the first data packet and execute the second function on the second data packet, wherein the first VNF outputs a first resultant data packet in response to executing the first function on the first data packet and the second VNF outputs a second resultant data packet in response to executing the second function on the second data packet.

20. The non-transitory computer-readable medium of claim 19, wherein the operations further comprise allocating a set of VNFs from the plurality of VNFs to execute a plurality of functions on the second data packet based on the one or more attributes associated with the second data packet.

21. The non-transitory computer-readable medium of claim 19, wherein the operations further comprise storing the one or more attributes associated with the first data packet and a plurality of functions executed to the first data packet in a data storage device.

22. The non-transitory computer-readable medium of claim 19, wherein the operations further comprise transferring a VNF of the plurality of VNFs to another network device.

23. The non-transitory computer-readable medium of claim 19, wherein the network device is a virtual machine host and the VNF includes state information associated with its operation.

24. The non-transitory computer-readable medium of claim 19, wherein instantiating the plurality of VNFs comprises instantiating the plurality of VNFs at a network edge.

25. The non-transitory computer-readable medium of claim 19, wherein instantiating the plurality of VNFs comprises instantiating the plurality of VNFs at a network core.

26. The non-transitory computer-readable medium of claim 19, wherein instantiating the plurality of VNFs comprises instantiating the plurality of VNFs at a datacenter.

27. The non-transitory computer-readable medium of claim 19, wherein the operations further comprise:

instantiating an additional VNF to the plurality of VNFs based on the one or more attributes associated with the first data packet; and coordinating the additional VNF and the first VNF to execute the first function.

28. The non-transitory computer-readable medium of claim 19, wherein the operations further comprise deleting a VNF from the plurality of VNFs.

\* \* \* \* \*